(12) United States Patent
Garel et al.

(10) Patent No.: US 11,656,371 B1
(45) Date of Patent: May 23, 2023

(54) HIGH DYNAMIC RANGE DETECTOR WITH CONTROLLABLE PHOTON FLUX FUNCTIONALITY

(71) Applicant: EL-MUL TECHNOLOGIES LTD., Rehovot (IL)

(72) Inventors: Jonathan Garel, Rehovot (IL); Amit Weingarten, Ramat Gan (IL); Semyon Shofman, Kiryat Ekron (IL); Alexander Kadyshevitch, Tel Aviv (IL)

(73) Assignee: El-Mul Technologies Ltd, Rehovot (IL)

( * ) Notice: Subject to any disclaimer, the term of this patent is extended or adjusted under 35 U.S.C. 154(b) by 101 days.

(21) Appl. No.: 17/342,636

(22) Filed: Jun. 9, 2021

Related U.S. Application Data

(60) Provisional application No. 63/036,959, filed on Jun. 9, 2020.

(51) Int. Cl.
G01T 1/20 (2006.01)
(52) U.S. Cl.
CPC ................. G01T 1/20185 (2020.05)
(58) Field of Classification Search
CPC .............................. G01T 1/20185
See application file for complete search history.

(56) References Cited

U.S. PATENT DOCUMENTS

| | | | |
|---|---|---|---|
| 4,359,706 A | 11/1982 | Flack | |
| 7,126,114 B2 | 10/2006 | Chernushevich | |
| 7,141,785 B2 | 11/2006 | Bateman et al. | |
| 7,180,060 B2 | 2/2007 | Chefetz et al. | |
| 7,265,346 B2 | 9/2007 | Whitehouse et al. | |
| 8,084,751 B2 | 12/2011 | Freedman et al. | |
| 9,530,632 B2 | 12/2016 | Kholomeev et al. | |
| 10,074,528 B2 | 9/2018 | Makarov et al. | |
| 10,488,529 B2 | 11/2019 | Makarov et al. | |
| 2004/0149900 A1 | 8/2004 | Makarov et al. | |
| 2011/0095177 A1 | 4/2011 | Giannakopulos et al. | |
| 2013/0048852 A1 | 2/2013 | Verenchikov | |

(Continued)

FOREIGN PATENT DOCUMENTS

WO 200612005 11/2006

OTHER PUBLICATIONS

Abele at. al. ,"Methodology of pole piece design in permanent magnets", Journal of Applied Physics 99, 08D903 (2006).

Primary Examiner — Mark R Gaworecki

(57) ABSTRACT

An ion detection system for detecting incident ions including an ion-to-electron converter for converting incident ions to secondary electrons, an accelerating assembly including at least one of an electric field and a magnetic field for acceleration and transfer of the secondary electrons to a scintillator, the scintillator for converting the accelerated secondary electrons to an initial flux of photons, a photon channeling assembly including a first photon channel and a second photon channel, wherein the photon channeling assembly is configured for separating the initial flux of photons into at least a first photon flux channeled into the first photon channel and a second photon flux channeled into the second photon channel, and at least one photodetector for detecting at least one of a first optical signal generated at the first photon channel, and a second optical signal generated at the second photon channel.

21 Claims, 15 Drawing Sheets

(56) References Cited

U.S. PATENT DOCUMENTS

| | | |
|---|---|---|
| 2013/0056627 A1 | 3/2013 | Verenchikov |
| 2013/0068942 A1 | 3/2013 | Verenchikov |
| 2015/0262806 A1 | 9/2015 | Shimomura |
| 2018/0041721 A1* | 2/2018 | Lewkow ............ H04N 5/35554 |
| 2020/0066502 A1 | 2/2020 | Bevis et al. |
| 2020/0185211 A1 | 6/2020 | Verenchikov et al. |
| 2020/0373143 A1 | 11/2020 | Verenchikov et al. |

* cited by examiner

HIGH DYNAMIC RANGE DETECTOR WITH CONTROLLABLE PHOTON FLUX FUNCTIONALITY

CROSS-REFERENCE TO RELATED APPLICATIONS

This Application claims priority benefit from U.S. Provisional Application No. 63/036,959, filed Jun. 9, 2020 entitled: "High Dynamic Range Mass Spec TOF Detector Based on Controllable Light Flux", the disclosure of which is incorporated herein by reference in its entirety.

TECHNICAL FIELD

This disclosure relates generally to detectors with controllable light flux functionality and particularly to detectors with controllable light flux functionality facilitated for detection of particles, such as ions, at high dynamic ranges.

BACKGROUND

Mass spectrometers (MS) are well-known as operative to separate and analyze ions based on their mass to a charge ratio (m/z). Mass spectrometry may be actualized in many different manners, such as by Time-of-Flight (TOF) mass spectrometers, wherein the mass to charge ratio (m/z) of the ions determines their flight time along a fixed flight path. The ions are emitted from a pulsed source as a packet of ions, generally including a variety of mass to charge ratios. The ion packets are directed along a fixed flight path through an evacuated region wherein time of flight mass separation is performed. The separated ions arrive at an ion detection system in pulses.

The packets of ions emitted by the pulsed source arrive at the ion detection system after a duration which depends upon their mass and charge, wherein for the same charge, an ion of greater mass will arrive later. Each packet typically comprises at least: ions with low abundance (i.e. with few ions, as low as a single ion), ions with high abundance (i.e. with a large number of ions, e.g. up to hundreds of thousands or more) or a combination thereof.

An ion detection system comprises a detector for detecting incoming ion pulses and thus generates an output signal indicative of the number of ions in the ion pulse. Common detectors might saturate upon reaching a signal threshold. In a non-limiting example, a detector comprising a Photomultiplier Tube (PMT) generates an electric output signal, which corresponds to the incoming ion pulse. In a non-limiting example, the PMT detector may saturate at an electron output signal of about 0.1-10V (e.g. 1V), thereby limiting the ion detection system dynamic range. Reducing the detector gain in order to prevent saturation for high abundance ions might result in a non-measurable signal level (signal below the noise level of the system) or poor SNR signal for ions with low abundance. A high dynamic range allows for detecting small ion packets as well as large ion packets simultaneously.

SUMMARY

There is thus provided in accordance with an embodiment of the present disclosure an ion detection system for detecting incident ions including an ion-to-electron converter for converting incident ions to secondary electrons, an accelerating assembly including at least one of an electric field and a magnetic field for acceleration and transfer of the secondary electrons to a scintillator, the scintillator for converting the accelerated secondary electrons to an initial flux of photons, a photon channeling assembly including a first photon channel and a second photon channel, wherein the photon channeling assembly is configured for separating the initial flux of photons into at least a first photon flux channeled into the first photon channel and a second photon flux channeled into the second photon channel, and at least one photodetector for detecting at least one of a first optical signal generated at the first photon channel, and a second optical signal generated at the second photon channel.

In some embodiments, at least one light guide is for guiding at least one of the first photon flux and the second photon flux, to the photodetector, thereby yielding an output signal from at least one of the first optical signal and the second optical signal.

In some embodiments, the photon channeling assembly includes a first light guide for propagation of the first photon flux to a first photodetector and a second light guide for propagation of the second photon flux to a second photodetector. In some embodiments, the first light guide is arranged orthogonally in respect to the second light guide.

In some embodiments, a diffusive surface is positioned intermediate the first light guide and the second light guide. In some embodiments, a reflective surface is positioned intermediate the first light guide and the second light guide, the reflective surface is formed with an aperture therein for passage of a portion of photons therethrough.

In some embodiments, the arrival time of the first photon flux to a first photodetector and the arrival time of the second photon flux to a second photodetector is substantially synchronous. In some embodiments, wherein a portion ratio measuring the percentage of the first photon flux from the initial photon flux Vs. the percentage of the second photon flux from the initial photon flux is in the range of 99:1% to 90:10%.

In some embodiments, the ion detection system is configured with a large dynamic range and is operative to detect an initial ion flux including a number of ions in the range of 1-100,000 ions.

In some embodiments, the light guide is formed with a circular cross section. In some embodiments, the ion detection system further includes a switch designated to toggle between a detection of the first optical signal and the second optical signal. In some embodiments, the photon channeling assembly includes a single light guide and the separation between the first photon channel and the second photon channel is facilitated by the switch.

In some embodiments, the photon channeling assembly includes a beam splitter configured for splitting the initial flux of photons into the first photon channel and the second photon channel. In some embodiments, the photon channeling assembly includes a filter for separating the initial flux of photons into the first photon channel and the second photon channel.

In some embodiments, the ion detection system is utilized in a mass spectrometer system.

There is thus provided in accordance with an embodiment of the present disclosure a particle detection system for detecting incident particles including an optional ion-to-electron converter for converting incident particles to secondary electrons, a scintillator for converting the secondary electrons to an initial flux of photons, a photon channeling assembly including a first photon channel and a second photon channel, wherein the photon channeling assembly is configured for separating the initial flux of photons, emitted from the scintillator, into at least a first photon flux channeled into the first photon channel and a second photon flux channeled into the second photon channel, and at least one photodetector for detecting at least one of a first optical signal generated at the first photon channel, and a second optical signal generated at the second photon channel.

In some embodiments, the particle includes any one of ions, primary electrons, secondary electrons, tertiary electrons, back scattered electrons, neutrons, molecules, X-rays, gamma-rays, photons and a combination thereof.

There is thus provided in accordance with an embodiment of the present disclosure a photon channeling assembly for separating an initial flux of photons including a photon channeling zone wherein the initial photon flux is separated into a first photon flux and a second photon flux, a first photon channel for propagation of the first photon flux therethrough, a second photon channel for propagation of the second photon flux therethrough, and at least one photodetector for detecting at least one of a first optical signal generated at the first photon channel, and a second optical signal generated at the second photon channel.

In some embodiments, the photon channeling zone includes any one of a diffusive surface configured for separating the first photon flux from the second photon flux, a reflective surface including an aperture and configured for separating the first photon flux from the second photon flux, a beam splitter configured for separating the first photon flux from the second photon flux, and a filter configured for separating the first photon flux from the second photon flux.

There is thus provided in accordance with an embodiment of the present disclosure a method for particle detection of incident particles, including optionally converting incident particles to secondary electrons, converting the secondary electrons to an initial flux of photons, separating the initial flux of photons into at least a first photon flux channeled into a first photon channel and a second photon flux channeled into a second photon channel, and detecting at least one of a first optical signal generated at the first photon channel, and a second optical signal generated at the second photon channel.

In some embodiments the separating is performed by at least one of a diffusive surface, a reflective surface including an aperture, a beam splitter, and a filter.

DETAILED DESCRIPTION OF EMBODIMENTS

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Figure 1:
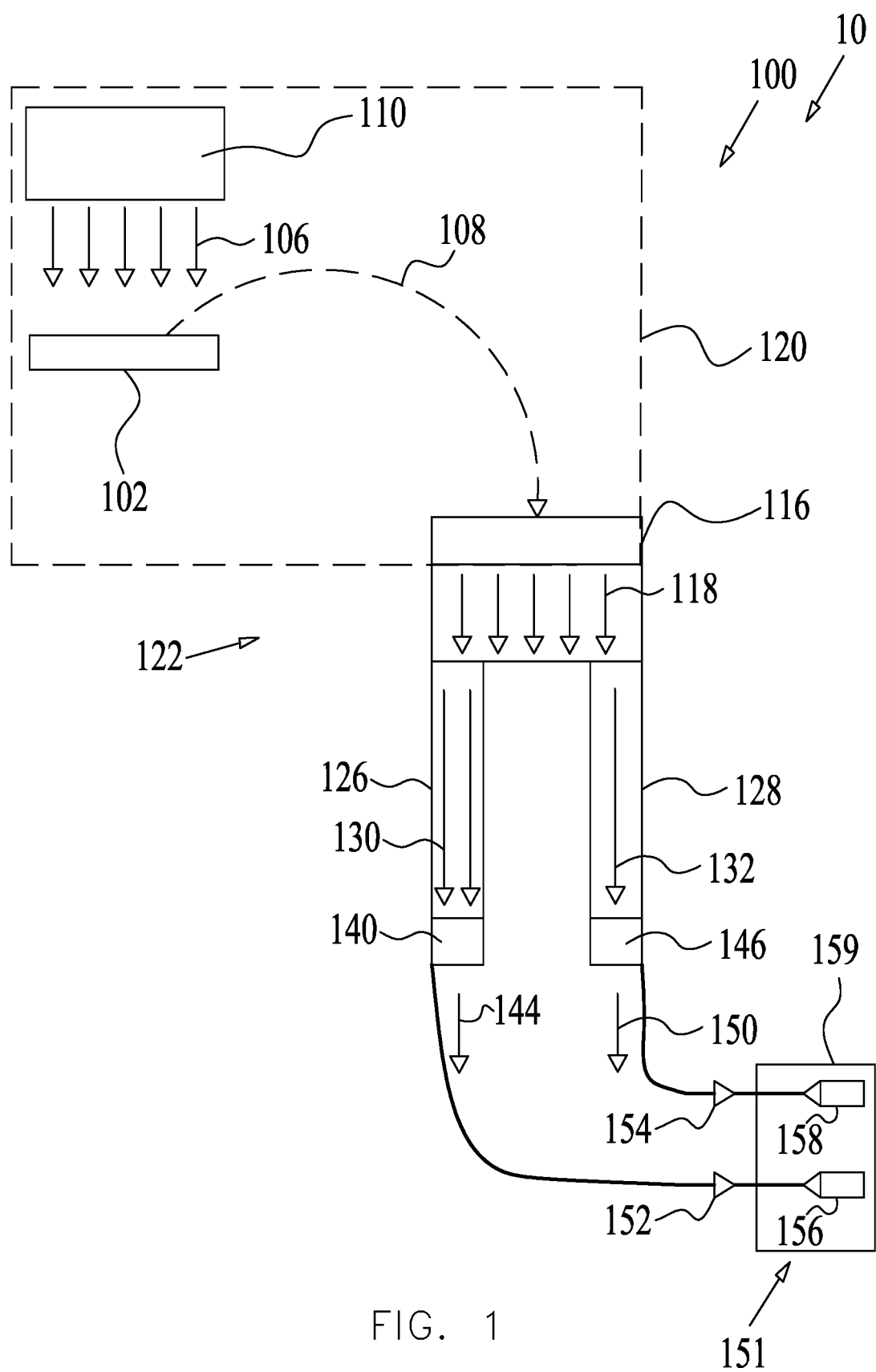
FIG. 1 is a simplified illustration of a particle detection system, constructed and operative according to an embodiment of the present disclosure.

As seen in FIG. 1, a particle detection system 10 is provided for detecting any type of particle. The particle detection system 10 may comprise an ion detection system 100 including an optional ion-to-electron convertor 102 for converting a flux of ions 106 impinging thereon to secondary electrons 108. The ion flux 106 may be emitted from an ion source 110, typically a mass analyzer or a TOF flight tube in a non-limiting example, where the ion flux 106 is emitted from a pulsed source. The ion source 110 may be a component of a mass spectrometer system in a non-limiting example.

The secondary electrons 108 impinge upon a scintillator 116, operative for converting the secondary electrons 108 into an initial flux of photons 118.

In some embodiments, the particle detection system 10 comprises an accelerating assembly 120 including at least one of an electric field and/or a magnetic field for acceleration and transfer of the secondary electrons 108 to the scintillator 116.

In standard ion detection systems the initial flux of photons 118 is detected by a photodetector, which converts and amplifies the signal generated by the initial flux of photons 118 into electrical current for further analysis thereof. Yet photodetectors saturate upon reaching a signal threshold, thereby limiting the ion detection system dynamic range.

In a non-limiting example, the photodetector operates with a linear correlation between the number of ions in the ion flux 106 and the electronic output signal, e.g. 100 ions will generate a signal of 100 millivolts and likewise 1000 ions will generate a signal of 1V. The photodetector typically saturates at an electron output signal of about 0.1-10V. In a non-limiting example, the photodetector might saturate at 1V, which may be generated by an ion flux produced by an ion pulse of about 1000 ions, thus limiting the dynamic range to 1000 ions.

There is thus provided in accordance with an embodiment of the present disclosure, a photon channeling assembly 122 including at least a first photon channel 126 and a second photon channel 128. The photon channeling assembly 122 is configured for separating the initial flux of photons 118, emitted from the scintillator 116, into at least: (i) a first photon flux 130, which is channeled into the first photon channel 126 and (ii) a second photon flux 132, which is channeled into the second photon channel 128.

In the embodiment of FIG. 1, the first photon channel 126 is designed to comprise a high photon flux channel, wherein a larger portion of the initial flux of photons 118 is channeled therein, while the second photon channel 128 is designed to comprise a low photon flux channel, wherein a smaller portion of the initial flux of photons 118 is channeled therein. A first photodetector 140, in operative communication with the first channel 126, detects the first photon flux 130 (i.e. as a first optical signal) and in response generates an electric output signal 144. A second photodetector 146 receives the second photon flux 132 (i.e., the low photon flux) as a second optical signal and in response generates an electric output signal 150.

The first and second photodetectors 140 and 146, respectively, may comprise any light sensor, such as in a non-limiting example a PMT, and HPD (Hybrid Photo Detector) or a silicon detector, such as an APD (avalanche photo-diode) and the like. The first and second photodetectors 140 and 146 may comprise the same or different type of detector.

The first and second photodetectors 140 and 146 may be configured to operate at the same gain or at different gains (e.g., the first photodetector gain is less than the second photodetector gain, or the first photodetector gain is more than the second photodetector gain). The photodetector gain measures the increase of an output signal, generated by a photodetector from impingent of a light signal (namely a photon signal from the photon flux) thereon.

In a non-limiting example, the gain ratio between the first and second photodetectors 140 and 146 is about 1:100 or vice versa. In a non-limiting example, the gain ratio between the first and second photodetectors 140 and 146 is about 1:10 or vice versa. In a non-limiting example, the gain ratio between the first and second photodetectors 140 and 146 is about 1:1000 or vice versa. In a non-limiting example, the gain ratio between the first and second photodetectors 140 and 146 is 1:1.

In a non-limiting example, the high flux may be in the range of about $10^7$-$10^{11}$ photons per seconds and the low flux may be in the range of about $10^3$-$10^7$ photons per seconds.

The photon channeling assembly 122 significantly expands the dynamic range by separating the initial photon flux into at least a high and low photon flux. In a high flux mode, the photodetector is impinged upon by the high photon flux 130 and detects a first, typically lower dynamic subrange, (e.g. 1-1000 ions, in a non-limiting example). In a low flux mode, the photodetector is impinged upon by the low photon flux 132 and detects a second, typically higher dynamic subrange, (e.g. 100-100,000 ions, in a non-limiting example), thus providing ion detection at a broad dynamic range, e.g., a range of 1-100,000 ions.

It is appreciated that the dynamic range may include a larger range of ions (i.e. in the range of 1 to higher than 100,000) and subranges thereof.

It is noted that the photon channeling assembly 122 may comprise a plurality of channels in operative communication with one or more photodetectors for detecting a dynamic subrange of ion pulses.

The first and second output signals 144 and 150 may be processed in a signal processing system 151, which may comprise elements for processing the first and second output signals 144 and 150 to generate digital data. Such elements may comprise amplifiers, analog-to-digital converters (ADC), analyzers, signal processing machines (e.g. machines including a memory and processor) and the like.

Any one of the first and/or second photodetectors 140 and 146, respectively, may be configured to operate with a respective first and second electronic amplifier 152 and 154. The first and second output signals 144 and 150 and/or the output signals from the first and second electronic amplifiers 152 and 154 may be converted to digital signals using first and second ADC elements 156 and 158, respectively. A signal processing machine 159 may be provided for further analysis and processing of the output digital signal from the first and/or second ADC elements 156 and 158.

To utilize the full range of the first and/or second ADC elements 156 and 158, the first and/or second electronic amplifiers 152 and 154 may be configured to operate at the same gain or at different gains.

FIGS. 2A-5B show the ion detection system 100 comprising the photon channeling assembly 122 designed and operative according to some embodiments of the present disclosure. In the photon channeling assembly 122 of FIGS. 2A-5B, the first photon channel 126 comprises a first light guide 160 in photonic communication with the second photon channel 128 comprising a second light guide 164 at a photon channeling zone 166. At the photon channeling zone 166 the initial photon flux 118 is diverged to the first photon flux 130, propagating via the first light guide 160, and to the second photon flux 132, propagating via the second light guide 164. The diversion (namely the separation) of the first and second photon flux 130 and 132, respectively, may be performed in any suitable manner, such as by selectively diverting a portion of photons from the first light guide 160 into the second light guide 164.

The separation ratio between the first photon flux 130 and the second photon flux 132, namely the number of photons diverted to the first photon flux 130 Vs. the number of photons diverted to the second photon flux 132 may be any ratio in the range of 1000:1 to 1:1000 and subranges thereof. In a non-limiting example, the separation ratio may be any ratio in the range of 100:1 to 1:100 and subranges thereof. In a non-limiting example, the separation ratio may be any ratio in the range of 10:1 to 1:10 and subranges thereof. In a non-limiting example, the separation ratio may be any ratio in the range of 1:1.

The portion ratio measuring the percentage of the first photon flux 130 from the initial photon flux 118 Vs. the percentage of the second photon flux 132 from the initial photon flux 118 may be any ratio in the range between 100:0 (namely the first photon flux 130 comprises all photons of the initial photon flux 118) to the range between 0:100 (namely the second photon flux 132 comprises all photons of the initial photon flux 118) and subranges thereof.

In a non-limiting example, the portion ratio may be any ratio in the range of 99:1% to 1:99% and subranges thereof. In a non-limiting example, the portion ratio may be any ratio in the range of 97:3% to 3:97% and subranges thereof. In a non-limiting example, the portion ratio may be any ratio in the range of 90:10% to 10:90% and subranges thereof. It is noted that the portion ratio assumes all photons remain in the first and second channels 126 and 128 and ignores loss of light therefrom. In some embodiments, the portion ratio sum may be less than 100%, e.g. resulting in a portion ratio of 90:3%.

The respective first and second light guides 160 and 164 may be formed of the same or different material and/or materials with the same or different refractive index. Non-limiting examples may include different types of glass, sapphire, etc.

Figure 2A:
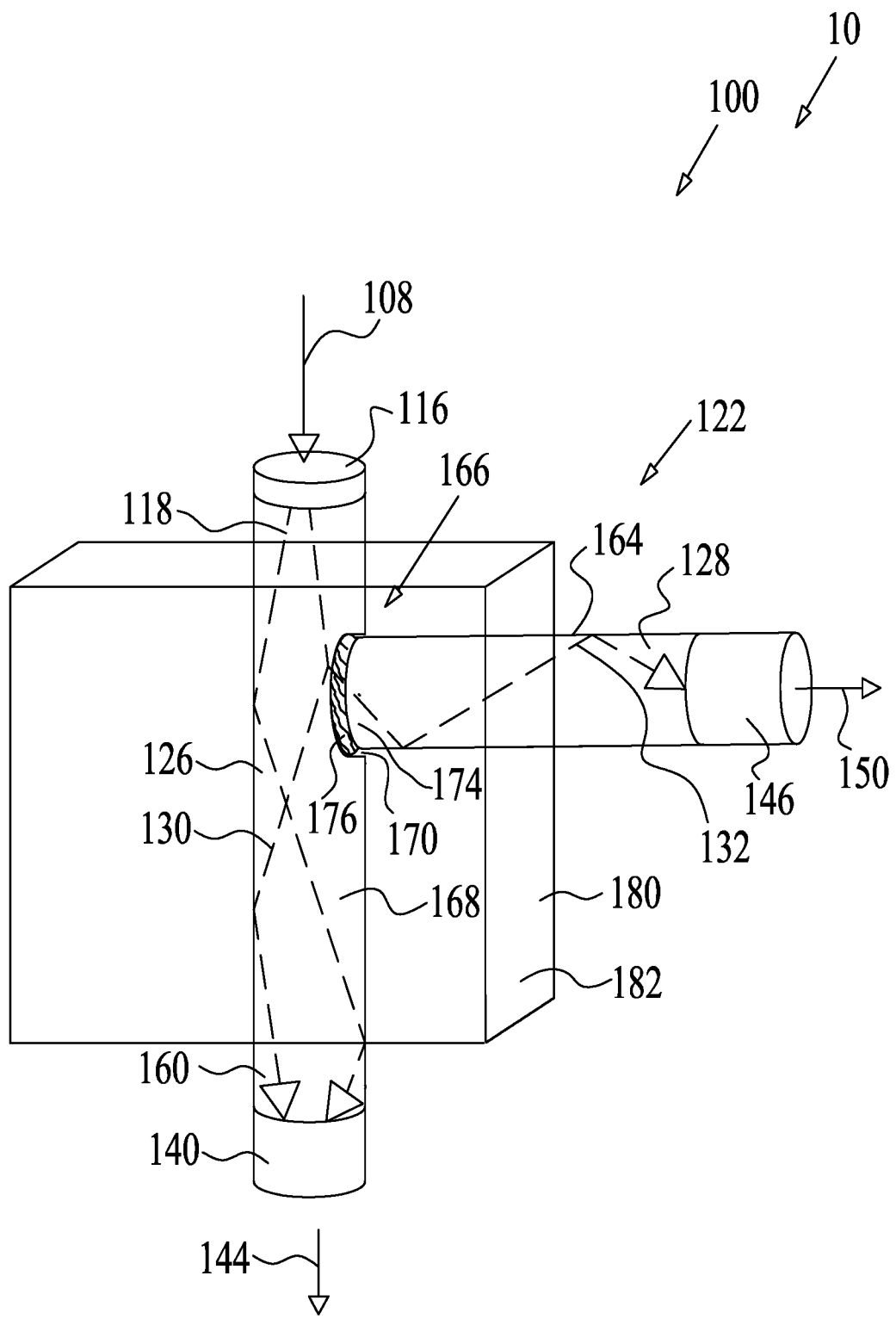
FIGS. 2A-2F are simplified illustrations of a particle detection system, constructed and operative according to an embodiment of the present disclosure.

As seen in FIG. 2A, the first light guide 160 may be formed on its lateral wall 168 with a groove 170 sized for mounting and physical coupling to the second light guide 164 at a base surface 174 of the second light guide 164. The second light guide 164 may be substantially orthogonally positioned in respect to the first light guide 160.

In some embodiments, the first light guide 160, at a surface of the groove 170, may comprise a diffusive surface 176. The diffusive surface 176 is provided for scattering a portion of photons, as light rays at arbitrary angles, into the second light guide 164, which comprises the second photon flux 132. The remaining portion of photons, comprising the first photon flux 130, propagates within the first light guide 160. The degree of diffusivity, is determined, inter alia, by the surface roughness and determines the degree of selective diversion of the photon portion. Accordingly, the larger the surface roughness the greater the diffusivity and thus the resultant second photon flux 132 is larger.

In some embodiments, the diffusive surface 176 may be formed in the second light guide 164.

The ion detection system 100, or at least a portion thereof, may be arranged within a housing 180 for providing mechanical durability and structure. The housing 180 may be formed of an optically impermeable material, such as a ceramic or any other suitable material, so as to prevent stray light, other than the initial photon flux 118, therein. The first light guide 160 may be positioned longitudinally within the housing 180 with the scintillator 116 protruding therefrom for impingement of the secondary electrons 108 thereon at a first end. The first photodetector 140 protrudes from the housing 180 at a second, opposite end. The second light guide 164 may be mounted within the housing 180 orthogonally to the first light 160. The second photodetector 150 protrudes from the housing 180 at a side 182 of the housing 180. It is noted that the ion detection system 100 may be arranged within the housing 180 in any suitable manner, such that the position of first light guide 160 is exchanged with the second light guide 164.

Furthermore, the second light guide 164 may be angularly mounted onto the first light guide 160, such that an angle formed therebetween at the photon channeling zone 166 may be an obtuse angle or an acute angle, as will be described hereinbelow in reference to FIG. 2C.

Moreover, the horizontal cross section 183 (i.e. orthogonal to its longitudinal axis 184 shown in FIG. 2B) of the first light guide 160 is circular and likewise the horizontal cross section 185 (i.e. orthogonal to its longitudinal axis 186) of the second light guide 164 is circular. It is appreciated that any one of the first light guide 160 and the second light guide 164 may be formed with any suitable cross section, the same or different.

Figure 2B:
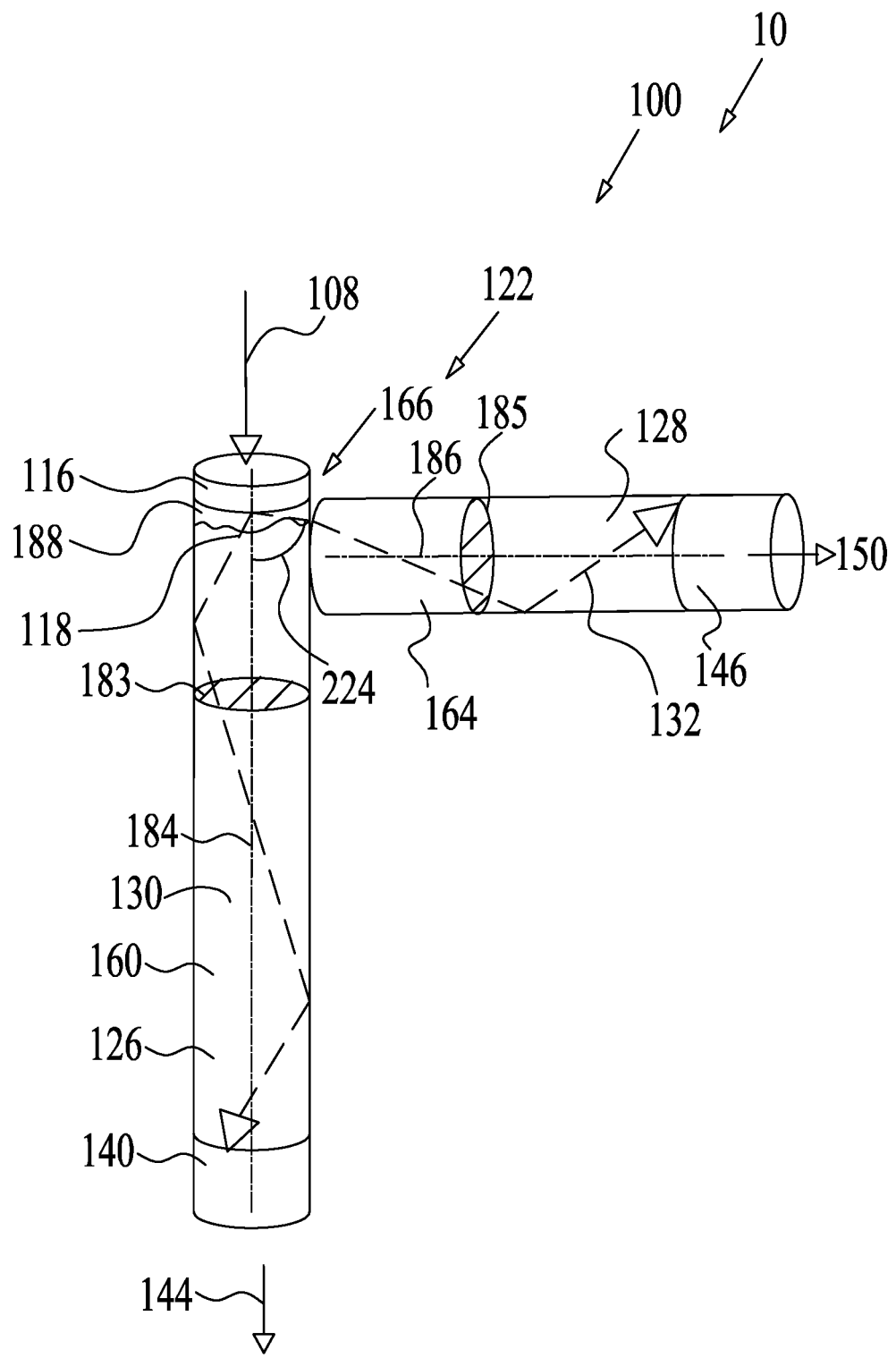

In FIG. 2B, the photon channeling assembly 122 comprises the second light guide 164 positioned orthogonally in respect to the first light guide 160. The first light guide 160 may be optically coupled to the scintillator 116, via optical coupling 188, such as an optical adhesive or the like. In some embodiments, the first light guide 160 may be optically coupled to the second light guide 164 via optical coupling (not shown), such as an optical adhesive or the like and/or may be coupled by partial or full physical contact intermediate the first light guide 160 and the second light guide 164.

A portion of the initial photon flux 118 propagates to the second light guide 164 to form the second photon flux 132, which may be the low photon flux. The remaining photons pass through the first light guide 160, to form the first photon flux 130, which may be the high photon flux. The detection may be performed as described in reference to FIGS. 1, 2A, 5A and 5B, mutatis mutandis.

Figure 2C:
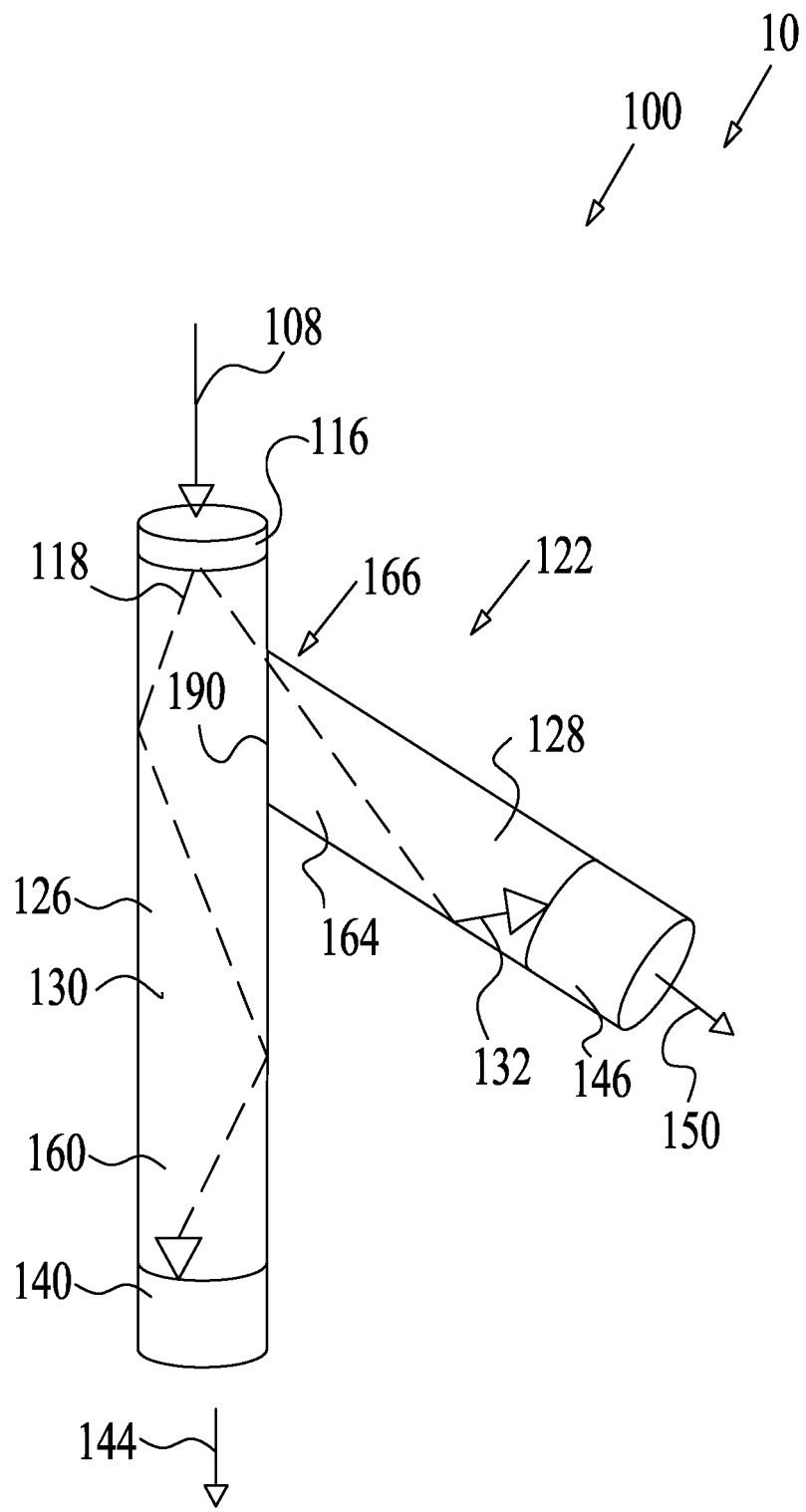

In FIG. 2C it is seen that the photon channeling assembly 122 comprises the second light guide 164 positioned angularly in respect to the first light guide 160. The angular position of the second light guide 164 is selected to facilitate entrance of a portion of the initial photon flux 118 therein. The entered portion of initial photon flux 118 forms the second photon flux 132, which may be the low photon flux. In some embodiments, the first light guide 160 may be optically coupled to the second light guide 164 and/or the scintillator 116, via optical coupling (not shown), such as an optical adhesive or the like and/or may be coupled by partial or full physical contact intermediate the first light guide 160 and the second light guide 164 and/or the scintillator 116. In any one of the embodiments disclosed herein, the first light guide 160 and/or the second light guide 164 at an interfacing surface 190 therebetween, may be polished or machined in any suitable manner to allow partial of full physical contact between the first light guide 160 and the second light guide 164.

The remaining photons continue passing through the first light guide 160, to form the first photon flux 130, which may be the high photon flux. The detection may be performed as described in reference to FIGS. 1, 2A, 5A and 5B, mutatis mutandis.

Figure 2D:
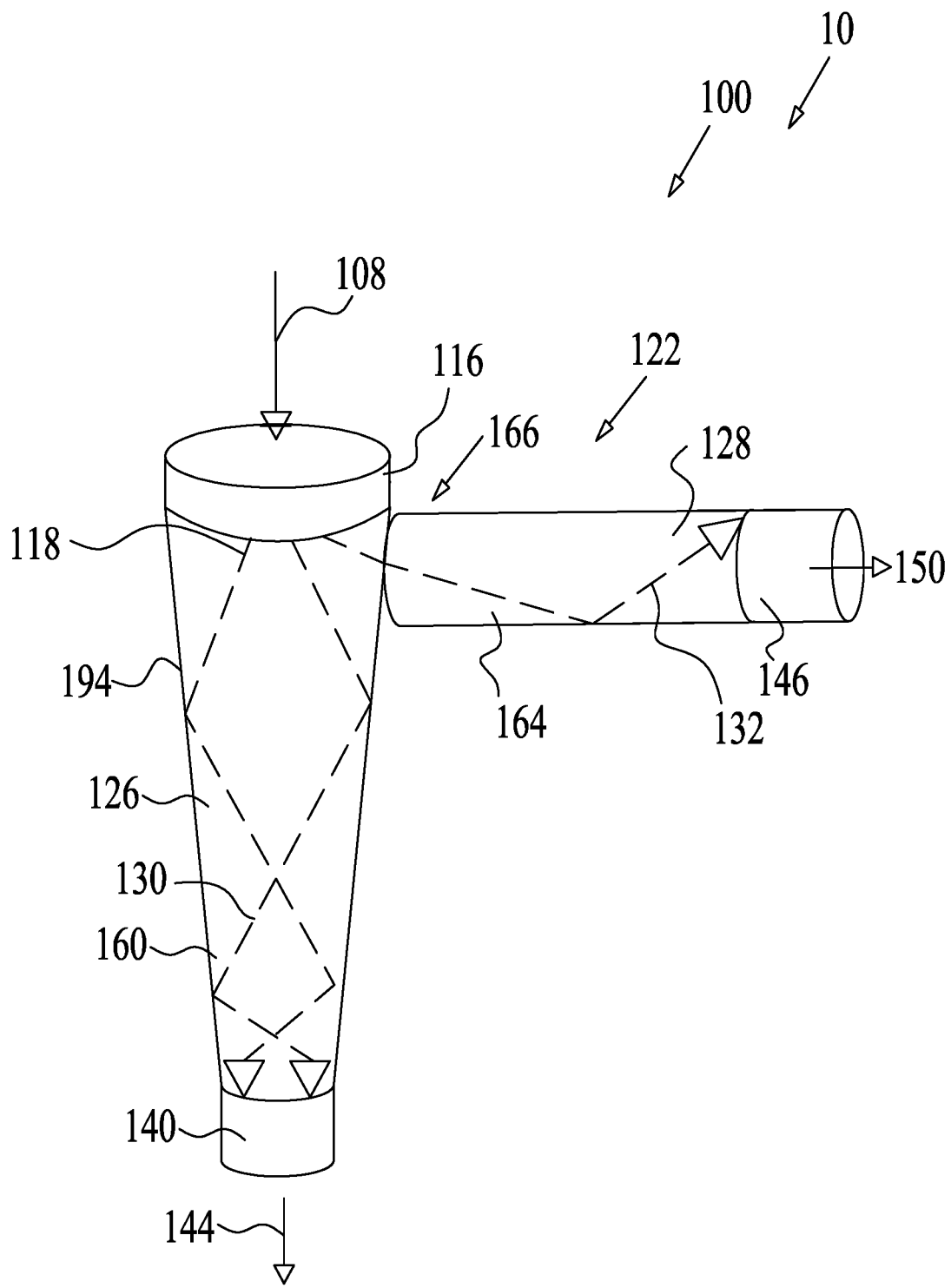

In FIG. 2D, the photon channeling assembly 122 comprises the first light guide 160 constructed with a tapering cross section, forming a conical-frustum like shape with an inclined lateral wall 194. The second light guide 164 is positioned orthogonally in respect to the first light guide 160. A portion of the initial photon flux 118 propagates to the second light guide 164 to form the second photon flux 132, which may be the low photon flux. The remaining photons continue passing through the first light guide 160, to form the first photon flux 130, which may be the high photon flux.

In some embodiments, the first light guide 160 may be optically coupled to the second light guide 164 and/or the scintillator 116, via optical coupling (not shown), such as an optical adhesive or the like and/or may be coupled by partial or full physical contact intermediate the first light guide 160 and the second light guide 164 and/or the scintillator 116.

The detection may be performed as described in reference to FIGS. 1, 2A, 5A and 5B, mutatis mutandis.

Figure 2E:
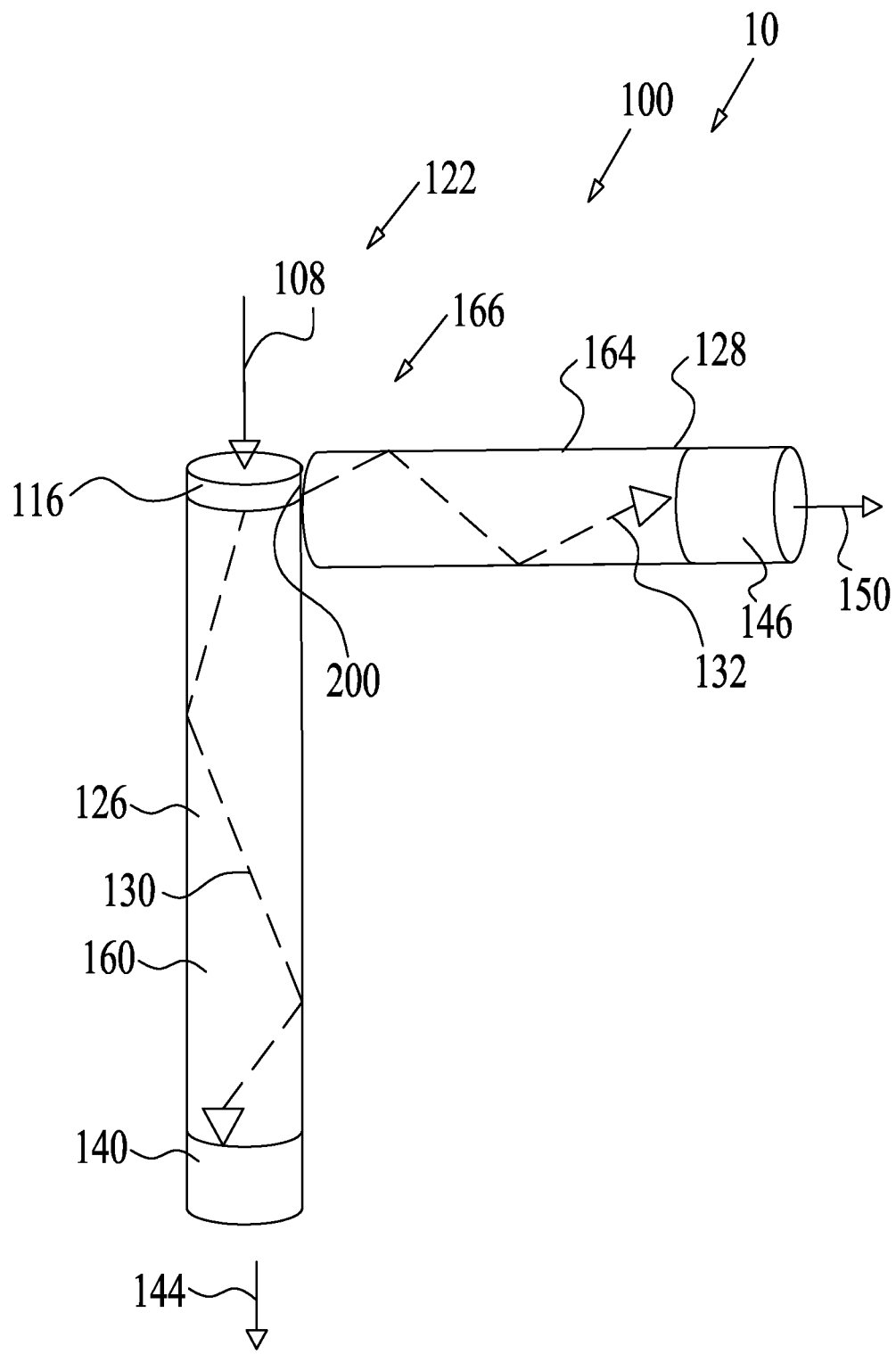

Turning to FIG. 2E it is seen that the photon channeling assembly 122 comprises the second light guide 164 positioned orthogonally to the first light guide 160 in proximity to the scintillator 116. At times photons inadvertently escape a side surface 200 of the scintillator 116. This phenomenon is exploited to perform the photon separation in the photon channeling assembly 122, such that the escaping photons propagates through to the second light guide 164 to form the second photon flux 132, which may be the low photon flux. The remaining photons continue passing through the first light guide 160, to form the first photon flux 130, which may be the high photon flux.

In some embodiments, the second light guide 164 may be mounted to the first light guide 160 and/or the scintillator by any fastening means and/or may be mounted in the housing 180 (FIG. 2A).

In some embodiments, the first light guide 160 may be optically coupled to the second light guide 164 and/or the scintillator 116, via optical coupling (not shown), such as an optical adhesive or the like and/or may be coupled by partial or full physical contact intermediate the first light guide 160 and the second light guide 164 and/or the scintillator 116.

The detection may be performed as described in reference to FIGS. 1, 2A, 5A and 5B, mutatis mutandis.

Figure 2F:
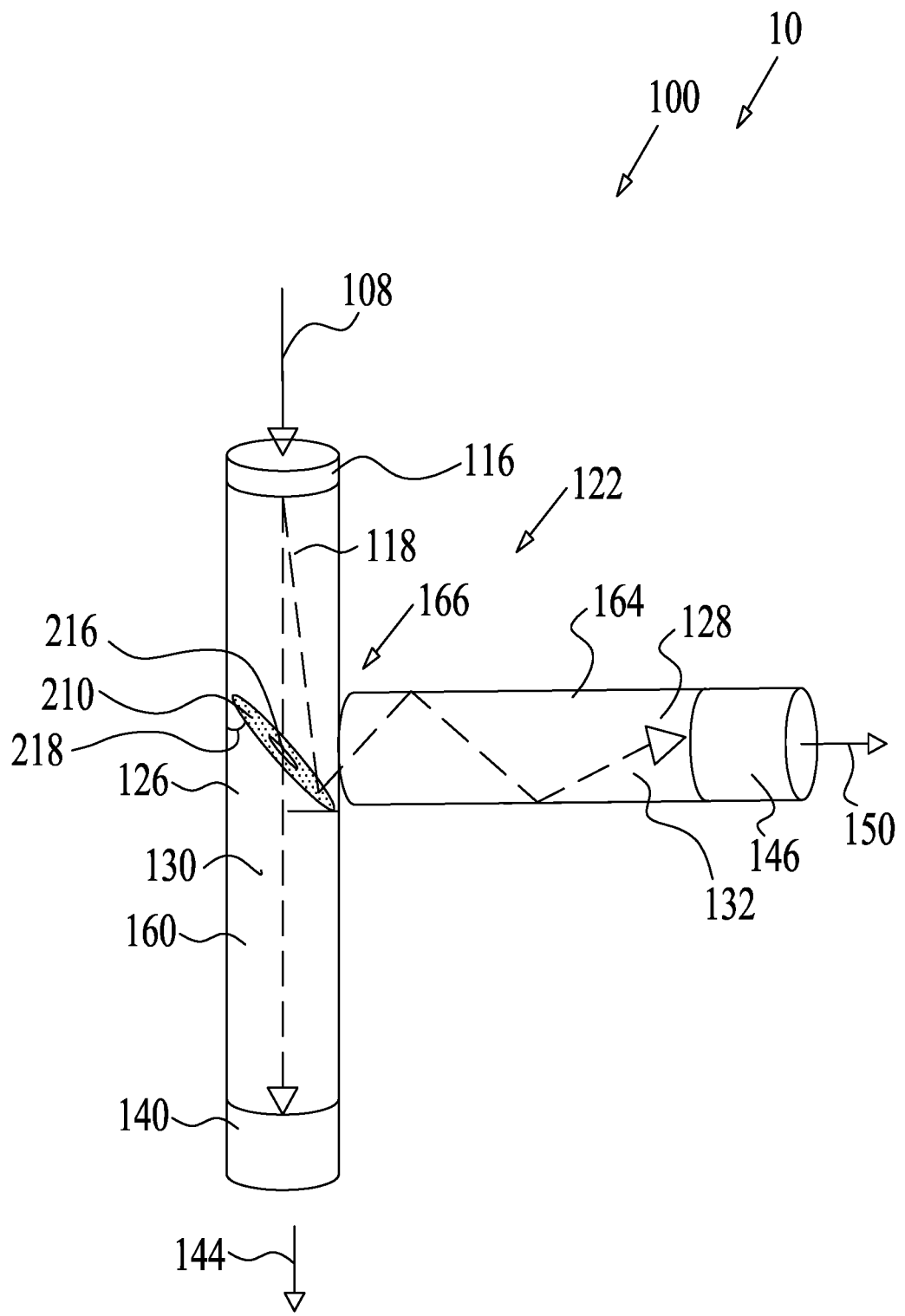

In FIG. 2F the photon channeling assembly 122 comprises the second light guide 164 positioned orthogonally to the first light guide 160. In some embodiments, the first light guide 160 may comprise a reflective surface 210, i.e. a mirror provided for reflecting into the second light guide 164 a portion of photons which now comprise the second photon flux 132. An aperture 216 may be formed within the reflective surface 210 for allowing of a portion of unreflected photons to remain within the first light guide 160 and propagate therethrough and form the first photon flux 130.

In some embodiments, as seen in FIG. 2F, the reflective surface 210 is slantingly positioned within the first light guide 160 at an angle 218 operative to reflect the portion of photons into the second light guide. In some embodiments, the reflective surface 210 may be positioned within the second light guide 164.

The degree of reflectivity of the reflective surface 210, the size of the aperture 216, as well as the incline angle 218 of the reflective surface 210, determine the separation ratio between the first and second channels 126 and 128, respectively.

The photon channeling assembly 122 of FIGS. 2A-2F comprises various arrangement and features of the first and second light guide 160 and 164, respectively. It is appreciated that the photon channeling assembly 122 may comprise a combination of the features described herein.

Figure 3:
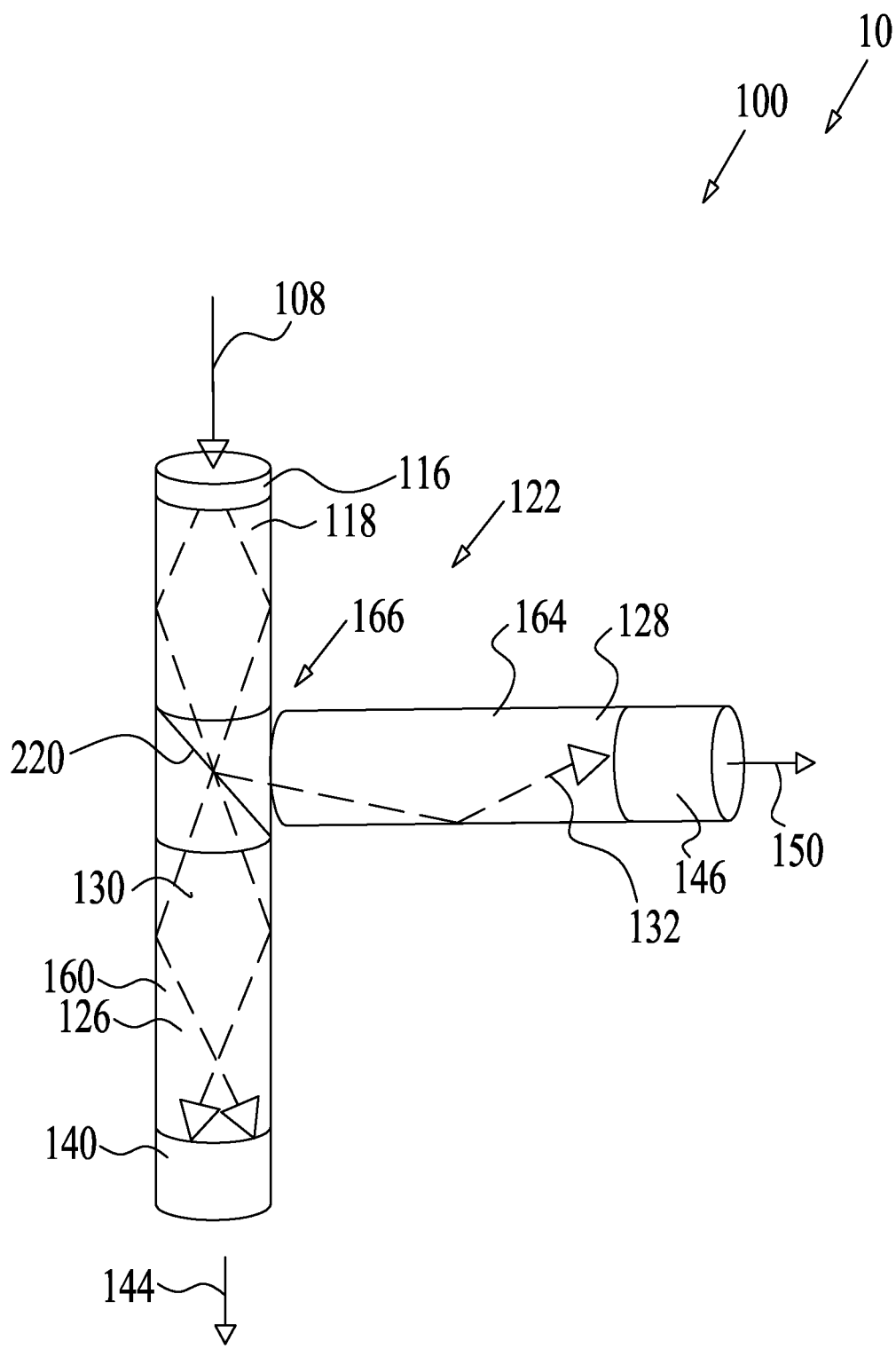
FIG. 3 is a simplified illustration of a particle detection system, constructed and operative according to an embodiment of the present disclosure.

Turning to FIG. 3 it is seen that the photon channeling assembly 122 comprises the second light guide 164 positioned orthogonally in respect to the first light guide 160. The photon channeling assembly 122 comprises at the photon channeling zone 166 a beam splitter 220 formed in any suitable manner for splitting the initial photon flux 118 into the first photon flux 130 which propagates in the first light guide 160 and the second photon flux 132 which propagates in the second light guide 164. The beam splitter 220 is operative to split the first photon flux 130 from the second photon flux 132 after the initial ion flux 106 has been converted to photons.

In a non-limiting example, the beam splitter 220 is configured to deflect a relatively small portion of the initial photon flux 118 to the second light guide 164 (i.e. the second channel 128) or at least a portion that is less than the remaining portion in the first light guide 160 (i.e. the first channel 126).

In some embodiments, a filter (e.g. filter 230 of FIGS. 4A and 4B) may be provided in addition to the beam splitter 220 to further control the separation of the initial photon flux 118 into the respective first and second photon flux 130 and 132 to achieve a predetermined separation ratio.

Various parameters determine the separation ratio between the first photon flux 130 and the second photon flux 132 (namely the number of photons diverted to the first photon flux 130 Vs. the number of photons diverted to the second photon flux 132).

These parameters may be, inter alia in a non-limiting example: (i) the size (e.g. diameter) and shape of the cross sections 183 and 185 (FIG. 2B) of the respective first and second light guides 160 and 164; (ii) the distance of the second light guide 164 from the scintillator 116 along the longitudinal axis 184. A smaller distance will allow more photons emitted from the scintillator 116 at larger angles 224 (in respect to longitudinal axis 184) to enter the second light guide 164. In a non-limiting example a smaller distance may be defined as a distance smaller than the diameter of the second light guide 164 or smaller than the diameter of the scintillator 116; (iii) the optical coupling of the second light guide 164 to the first light guide 160, such that a higher degree of optical coupling will allow more photons to enter the second light guide 164 and prevent their escape from the first light guide 160; (iv) the angular position of the second light guide 164 in respect to the first light guide 160 (i.e. an angle from between the longitudinal axis 184 and the longitudinal axis 186). (v) the material forming the respective first and second light guides 160 and 164 and their refractive index.

Figure 4A:
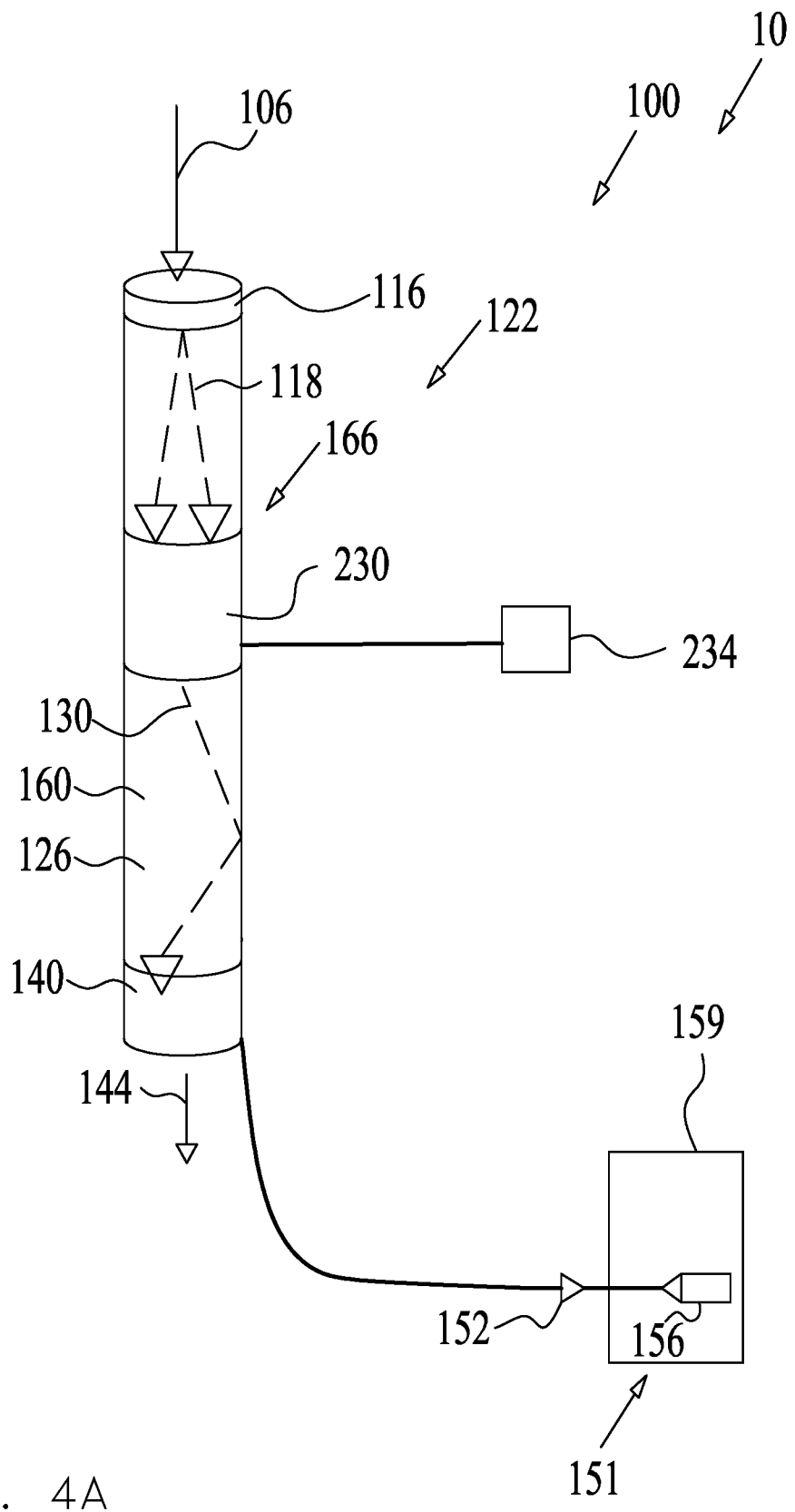
FIGS. 4A and 4B are simplified illustrations of a particle detection system, at a first operation mode (4A) and a second operational mode (FIG. 4B), constructed and operative according to an embodiment of the present disclosure.
Figure 4B:
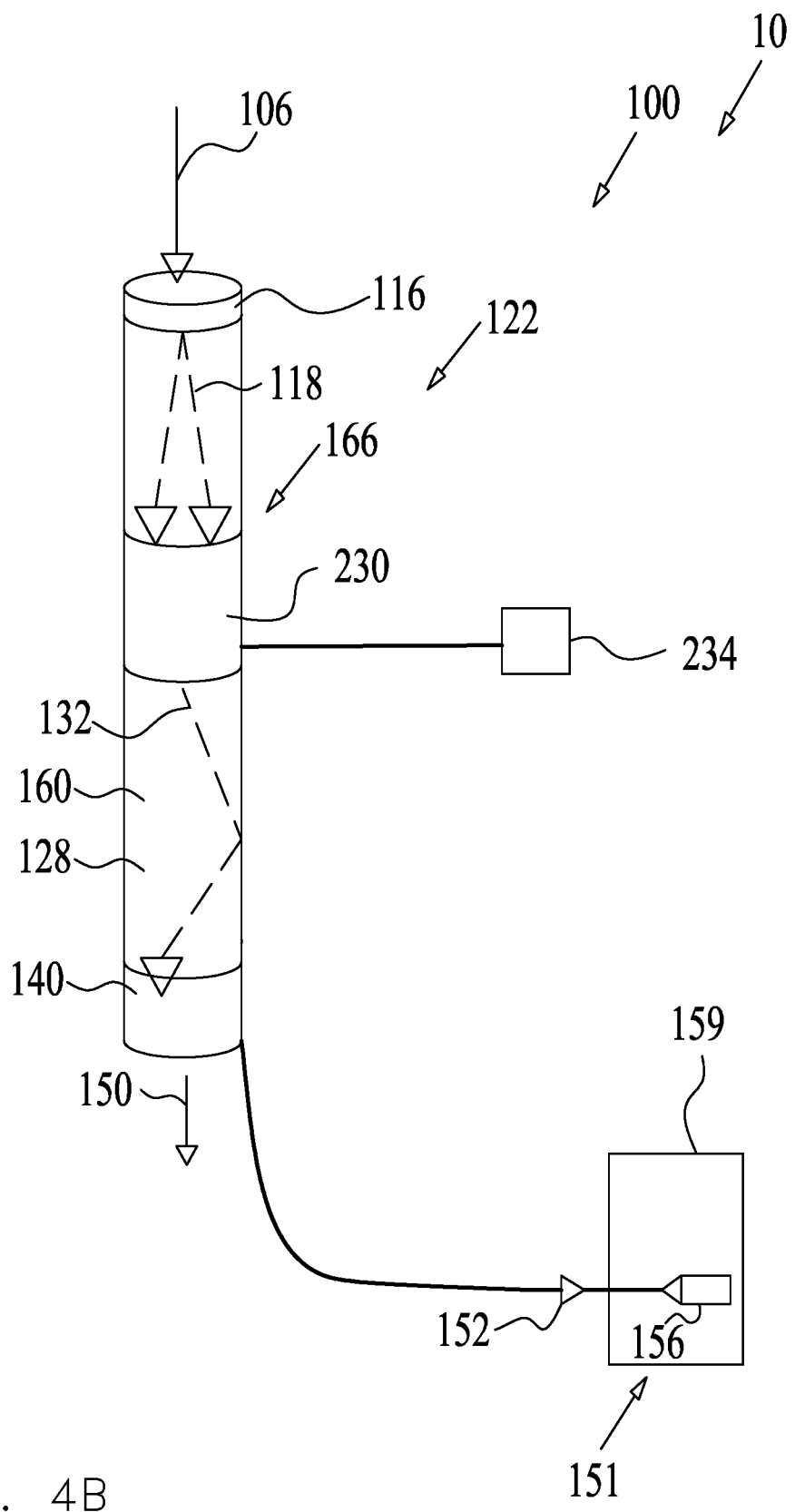

In FIGS. 4A and 4B, the photon channeling assembly 122 comprises a single light guide (here shown as first light guide 160) at the photon channeling zone 166. A filter 230, arranged within the light guide 160, is configured to select the intensity of the photon flux passing therethrough, thereby separating any one of the first photon flux 130 or the second photon flux 132 from the initial photon flux 118. In some embodiments, the filter 230 may be controlled by a switch 234 which may activate the filter 230 in a first mode and deactivate the filter 230 in a second mode (or vice versa).

For example, in a first mode shown in FIG. 4A, operatively, the light guide 160 serves as the first photon channel 126 during channeling and propagation of the first photon flux 130 therethrough to the photodetector 140 which generates the first output signal 144 (i.e., the high flux mode). In a second mode shown in FIG. 4B the light guide 160 serves as the second photon channel 128 during channeling and propagation of the second photon flux 132 therethrough to the photodetector 140 which generates the second output signal 150 (i.e. the low flux mode, shown in FIG. 4B).

In a non-limiting example, the filter may comprise Pockels cell comprising an electro-optic device operative to selectively transmit light therethrough via an electro-optic crystal, a variable ND filter (which is an ND filter with a gradient) coupled to few sensors, rotating polarizer, and the like.

The switch 234 (in a non-limiting example, a high frequency switch), may be designated to toggle between the high flux mode (by detecting the first output signal 144 in FIG. 4A), and the low flux mode (by detecting the second output signal 150 in FIG. 4B). The toggling of the switch 234 from the high flux mode to the low flux mode may be performed at predetermined intervals or in any other suitable manner.

The photodetector 140 may be configured to operate at the same gain or at different gains during the high flux mode and the low flux mode (e.g. the high flux mode gain is less than the low flux mode gain or the high flux mode gain is more than the low flux mode gain). The gain measures the increase of an output signal, generated by a photodetector from impingent of a light signal (namely from the photon flux) thereon.

In a non-limiting example, the gain ratio between the high and low flux mode is about 1:100 or vice versa. In a non-limiting example, the gain ratio between the high and low flux mode is about 1:10 or vice versa. In a non-limiting example, the gain ratio between the high and low flux mode is about 1:1000 or vice versa.

Figure 5A:
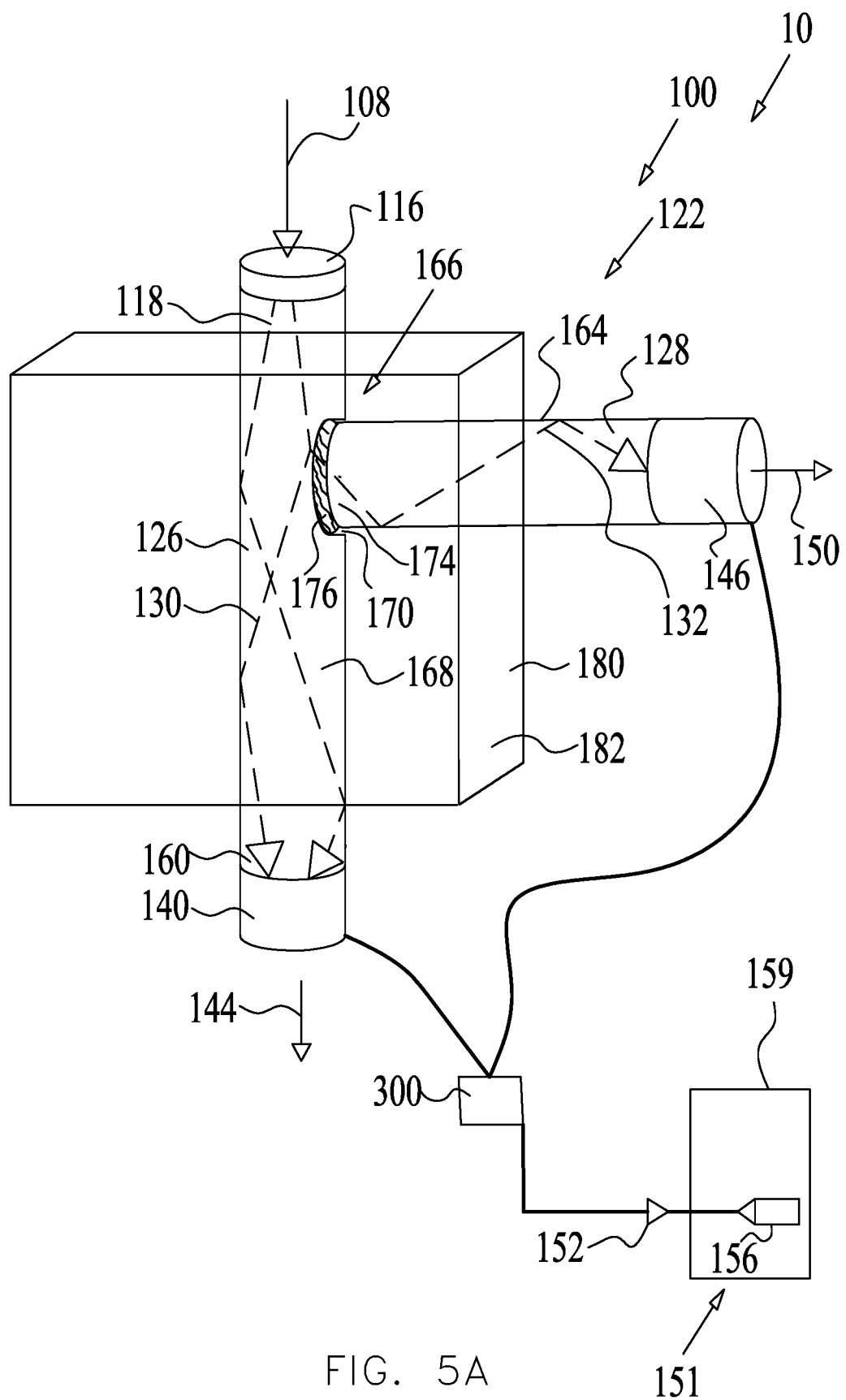
FIGS. 5A and 5B are simplified illustrations of a particle detection system, constructed and operative according to an embodiment of the present disclosure.
Figure 5B:
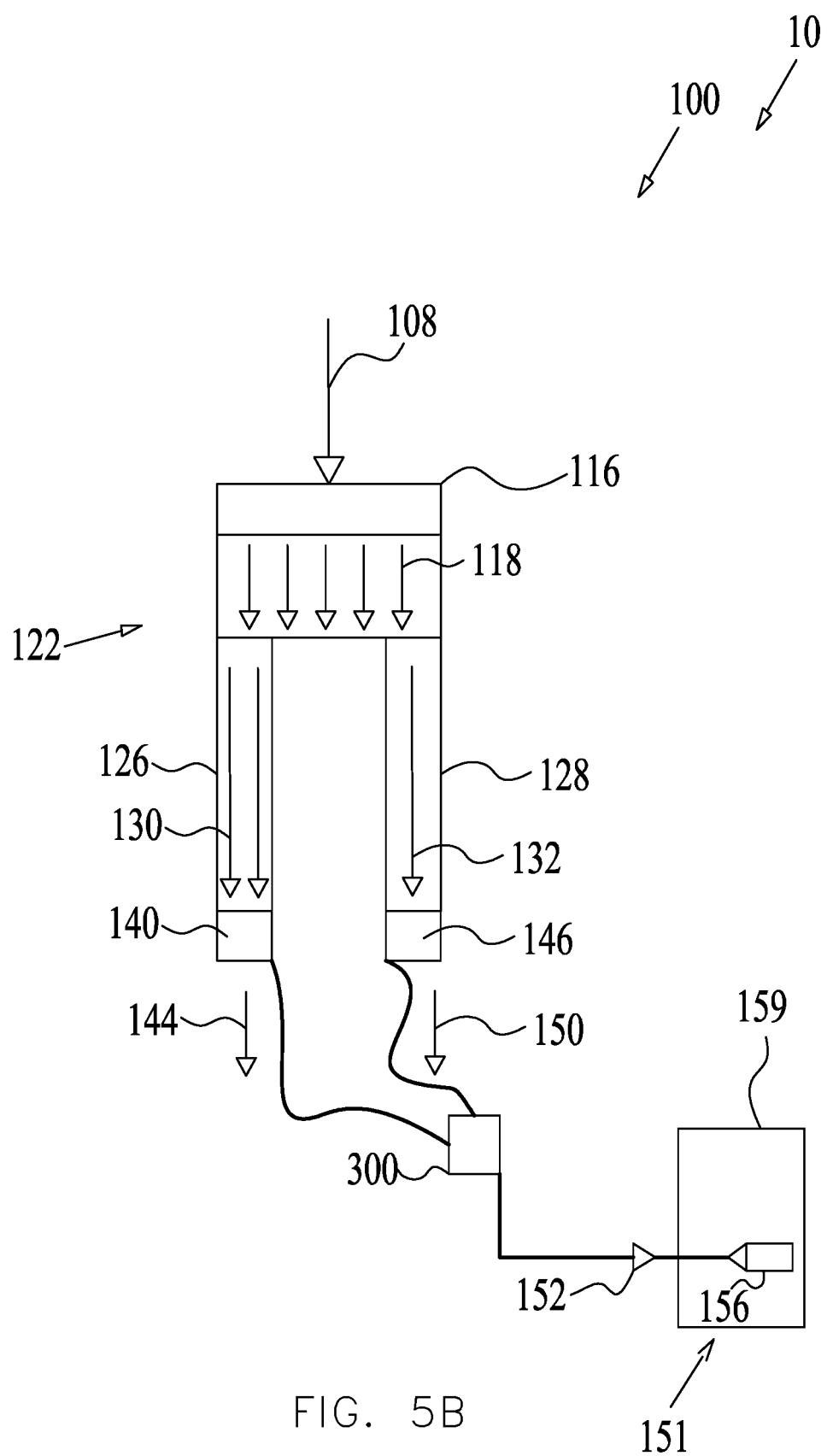

Reference is made to FIGS. 5A and 5B illustrating the signal communication between the photon channeling assembly 122 and the signal processing system 151. In the embodiment of FIG. 1, each of the first and second photodetectors 140 and 146 are in separate electrical communication with the signal processing system 151. In some embodiments, as seen in FIG. 5A, showing the configuration of FIG. 2A, a switch 300, (in a non-limiting example, a high frequency switch), may be designated to toggle between the detection of the high photon flux, namely the "high flux mode", (here comprising the first photon flux 130), via the first photodetector 140 and the low photon flux, namely the "low flux mode" (here comprising second photon flux 132), via the second photodetector 146. The toggling of the switch 300 from the high flux mode to the low flux mode may be performed at predetermined intervals or in any other suitable manner.

FIG. 5B shows an ion detection system 100 wherein the initial photon flux 118 is funneled into more than a single channel, such as the first and second respective channels 126 and 128. The switch 300 is provided to toggle between the first and second photodetectors 140 and 146, respectively and thereby broaden the dynamic range spectrum.

In some embodiments of FIGS. 5A and 5B, the processing system 151 may comprise a single electronic amplifier 152 and single ADC elements 156. During the high flux mode, the output signal 144 may be amplified, processed and analyzed by the single electronic amplifier 152 and/or single ADC elements 156 and signal processing machine 159. Likewise, during the low flux mode, the output signal 150 may be amplified, processed and analyzed by the single electronic amplifier 152 and/or single ADC element 156 and signal processing machine 159.

It is appreciated that the ion detection system 100 of any one of the embodiments of described herein may be utilized as a charged or uncharged particle detection system 10 facilitated for detecting other types of charged particles or uncharged (neutral) particles, such as in addition to ions may include electrons, e.g. primary electrons, secondary electrons, tertiary electrons or back scattered electrons, neutrons, molecules, X-rays, gamma-rays, photons or a combination thereof.

Figure 6:
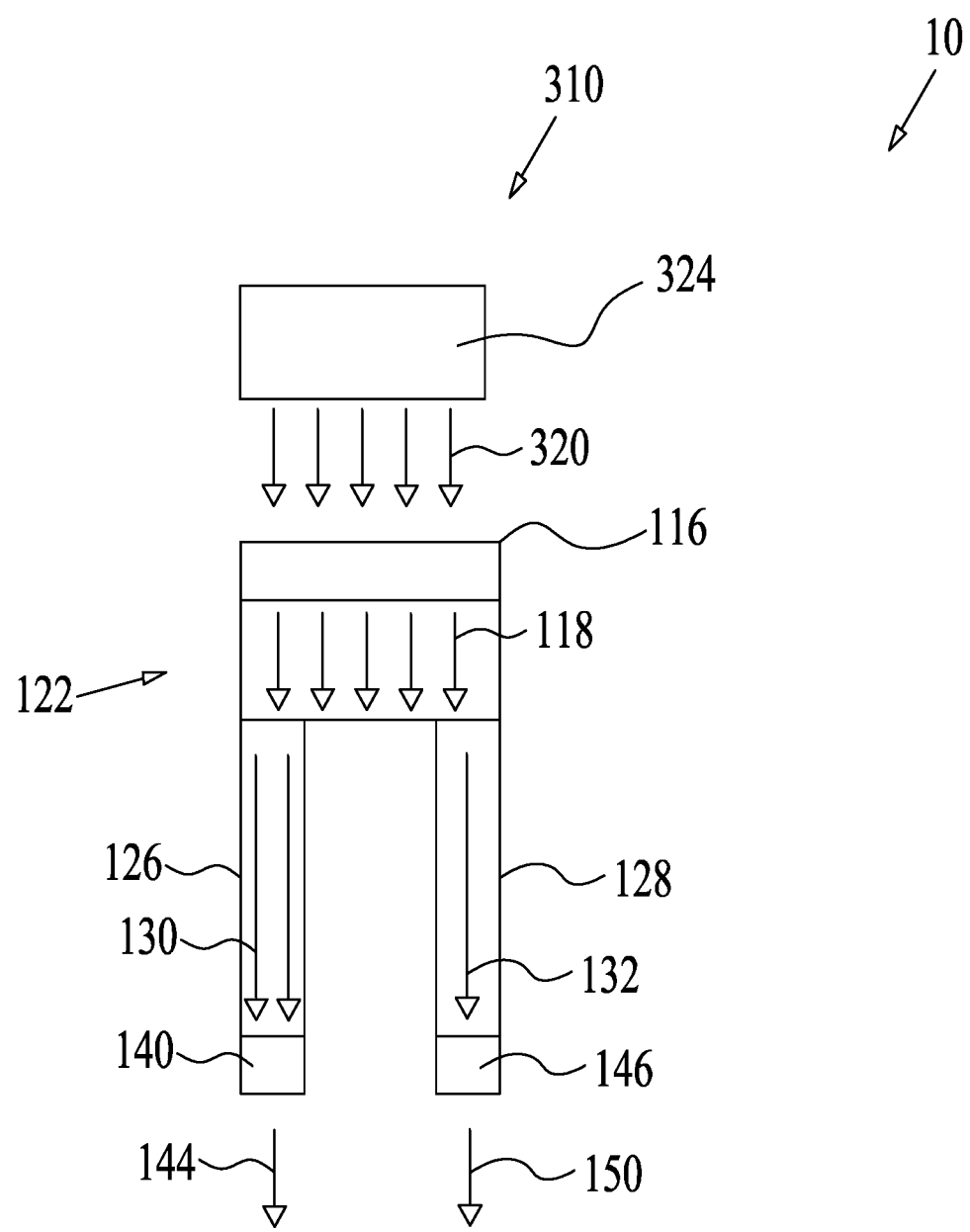
FIG. 6 is a simplified illustration of a particle detection system, constructed and operative according to an embodiment of the present disclosure.

As seen in FIG. 6, an electron detection system 310 is shown. Electrons 320, which may be any one of: primary electrons, secondary electrons, tertiary electrons, back scattered electrons or a combination thereof, are emitted from an electron source 324. The electrons 320 impinge upon scintillator 116 and are converted into the initial flux of photons 118. The initial flux of photons 118 are separated by the photon channeling assembly 122 and are detected by the respective first and second photodetectors 140 and 146. The emitted output signal 144 and/or output signal 150 are processed within the signal processing system 151, as described herein.

Figure 7:
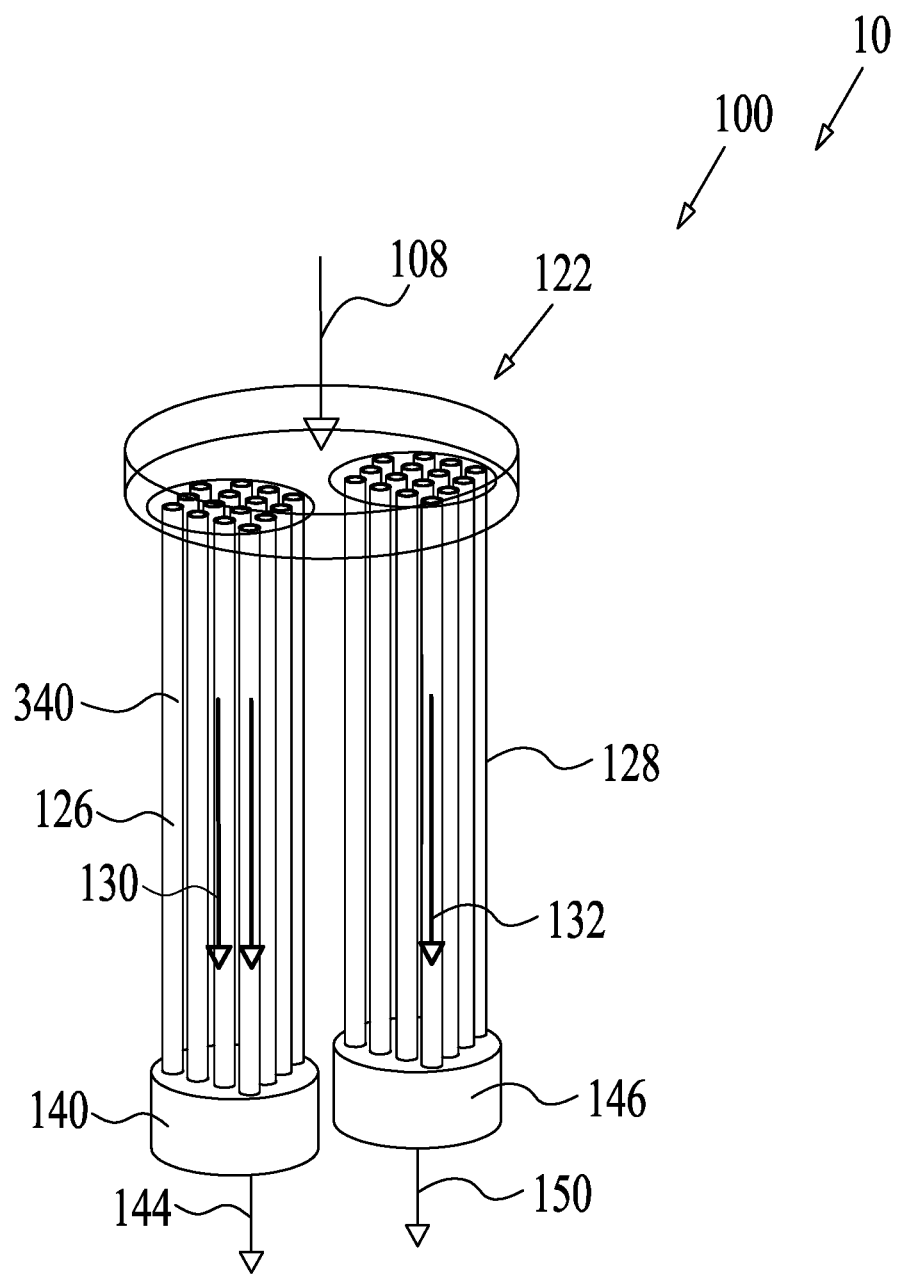
FIG. 7 is a simplified illustration of a particle detection system, constructed and operative according to an embodiment of the present disclosure.

FIG. 7 shows the ion detection assembly 100 wherein the first photon channel 126 and the second photon channel 128 of the photon channeling assembly 122 may comprise a single or bundle of optical fibers 340. The optical fibers 340 are provided for directing the first photon flux 130 and the second photon flux 132, following separation of the initial photon flux 118, to the first photodetector 140 and/or the second photodetector 146. The optical fibers may replace the first and/or second respective light guides 160 and 164.

Figure 8:
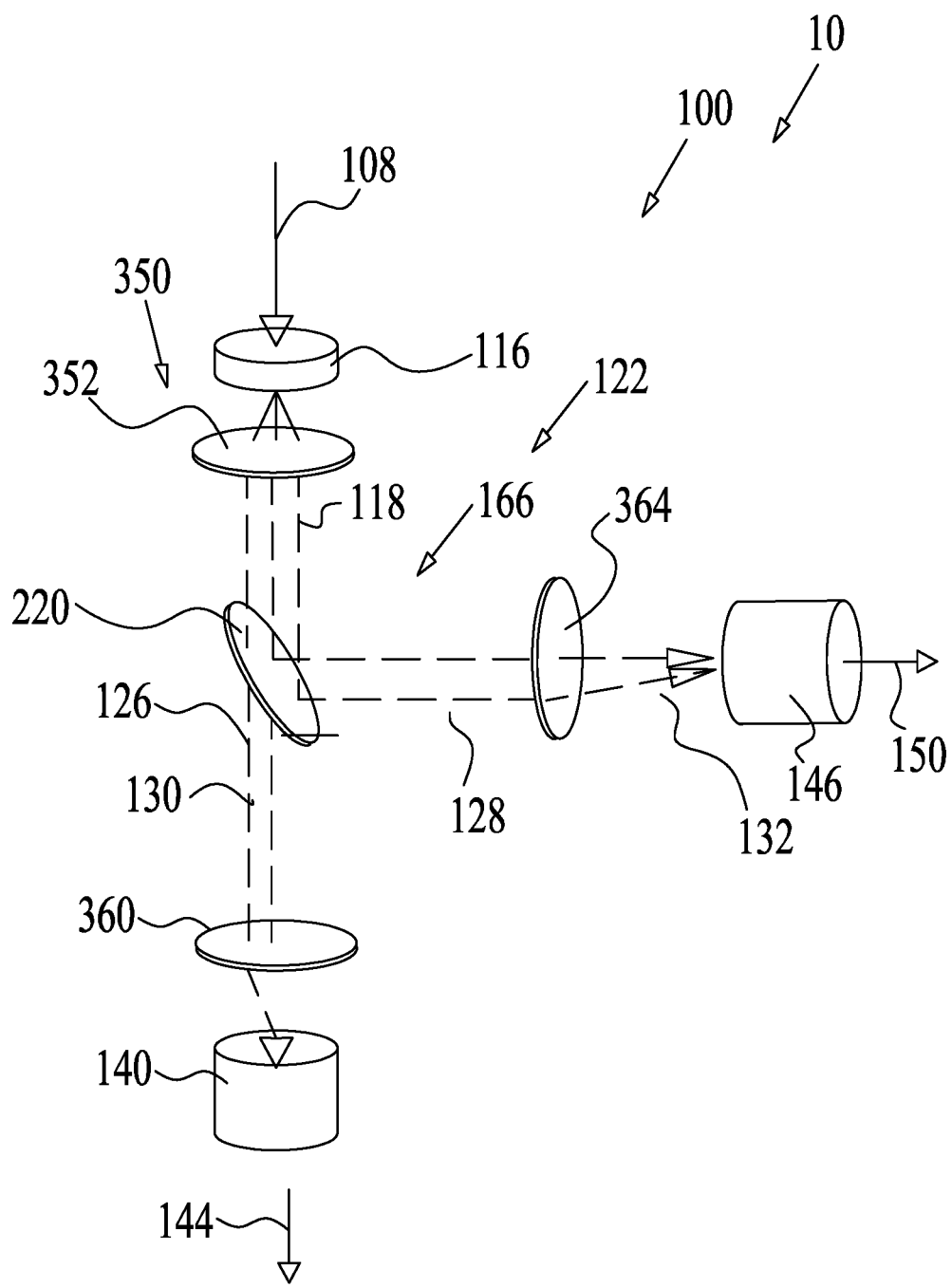
FIG. 8 is a simplified illustration of a particle detection system, constructed and operative according to an embodiment of the present disclosure.

In FIG. 8, the particle detection system 10 comprises an array of lenses 350. In some embodiments, a lens 352 is configured for directing the initial photon flux 118 emitted from the scintillator 116 to a channeling assembly 122 configured for separating the initial photon flux 118 into the first photon channel 126 and the second photon channel 128. The channeling assembly 122 may comprise a beam splitter 220 (FIG. 3), a mirror 210 (FIG. 2F) or any other separation means. A first channel lens 360 directs the first photon flux 130 to the first photodetector 140 for output of the first signal 144 therefrom. A second channel lens 364 directs the second photon flux 132 to the second photodetector 146 for output of the second signal 150 therefrom. The detection may be performed as described in reference to FIGS. 1, 2A, 5A and 5B, mutatis mutandis.

In accordance with some embodiments of the present disclosure, the first photon flux 130 and the second photon flux 132 may propagate via the respective first and second channels 126 and 128, generally synchronously (i.e., simultaneously) such that their arrival time to the respective first and second detectors 140 and 146, is generally synchronous (i.e., simultaneous). In a non-limiting example, synchronous (i.e., simultaneous) arrival time may be considered as within a range of 0-1000 nanoseconds or subranges thereof.

It is noted that the embodiments of the photon channeling assembly 122 described herein in reference to FIGS. 1-8 may be mounted in the ion detection assembly 100 in any suitable manner and may be housed in housing 180, mutatis mutandis.

It is appreciated that in any one of the embodiments of the present disclosure described herein in reference to FIGS. 1-8, the low photon flux can propagate via the first channel 130 and the high photon flux may propagate via the second channel 132.

The embodiments of FIGS. 1-8 show a dual channel configuration (first and second respective channels 126 and 128) which may propagate in physically separate mediums (e.g. at least two light guides as shown in FIGS. 2A-2F) or in the same medium (e.g. the first and second channel propagating in a single light guide at a first and second operational mode as shown in FIGS. 4A and 4B). Moreover, the particle detection system 10 may include a plurality of channels or a single channel.

The particle detection system 10 may be utilized in any particle system, such as any type of Mass Spectrometer such as a Time of Flight (TOF) Mass Spectrometer (MS), as well as electron microscopes, such as scanning electron microscopes (SEM), a transmission electron microscope (TEM) a dual beam system etc.

According to any one of the embodiments of the present disclosure described in reference to FIGS. 1-8, the photon channeling assembly 122, facilitating the first photon channel 126 and the second photon channel 128, operates whereupon the particles comprise photons, such that the channeling is performed by optical channeling (e.g. optical separation) namely, at an optical stage of the particle detection system 10.

While various inventive embodiments have been described and illustrated herein, those of ordinary skill in the art will readily envision a variety of other means, materials, or structure for performing the function, obtaining the results, or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be for example only and that the actual parameters, dimensions, materials, and configurations will depend upon the specific application or applications for which the inventive teachings is/are used. Those skilled in the art will recognize or be able to ascertain using no more than routine experimentation, many equivalents to the specific inventive embodiments described herein. It is, therefore, to be understood that the foregoing embodiments are presented by way of example only and that, within the scope of the appended claims, equivalents thereto, and any claims supported by the present disclosure, inventive embodiments may be practiced otherwise than as specifically described and claimed. Inventive embodiments of the present disclosure are directed to each individual feature, system, article, material, composition, kit, method, and step, described herein. In addition, any combination of two or more such features, systems, articles, materials, compositions, kits, methods, and steps, if such features, systems, articles, materials, compositions, kits, methods, and steps, are not mutually inconsistent, is included within the inventive scope of the present disclosure.

Embodiments disclosed herein may also be combined with one or more features, functionality, or materials, as well as complete systems, devices or methods, to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, as noted, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An ion detection system for detecting incident ions comprising:
    an ion-to-electron converter for converting incident ions to secondary electrons;
    an accelerating assembly comprising at least one of: an electric field and a magnetic field for acceleration and transfer of the secondary electrons to a scintillator,
    the scintillator for converting the accelerated secondary electrons to an initial flux of photons;
    a photon channeling assembly including a first photon channel and a second photon channel, wherein the photon channeling assembly is configured for separating the initial flux of photons into at least a first photon flux channeled into the first photon channel and a second photon flux channeled into the second photon channel; and
    at least one photodetector for detecting at least one of:
        a first optical signal generated at the first photon channel, and
        a second optical signal generated at the second photon channel.

2. An ion detection system according to claim 1, further comprising at least one light guide for guiding at least one of: the first photon flux and the second photon flux, to the photodetector, thereby yielding an output signal from at least one of: the first optical signal and the second optical signal.

3. An ion detection system according to claim 2, wherein the light guide is formed with a circular cross section.

4. An ion detection system according to claim 1, wherein the photon channeling assembly comprises: a first light guide for propagation of the first photon flux to a first photodetector and a second light guide for propagation of the second photon flux to a second photodetector.

5. An ion detection system according to claim 4, wherein the first light guide is arranged orthogonally in respect to the second light guide.

6. An ion detection system according to claim 4, wherein a diffusive surface is positioned intermediate the first light guide and the second light guide.

7. An ion detection system according to claim 4, wherein a reflective surface is positioned intermediate the first light guide and the second light guide, the reflective surface is formed with an aperture therein for passage of a portion of photons therethrough.

8. An ion detection system according to claim 1, wherein the arrival time of the first photon flux to a first photodetector and the arrival time of the second photon flux to a second photodetector is substantially synchronous.

9. An ion detection system according to claim 1, wherein a portion ratio measuring the percentage of the first photon flux from the initial photon flux Vs. the percentage of the second photon flux from the initial photon flux is in the range of 99:1% to 90:10%.

10. An ion detection system according to claim 1, being configured with a large dynamic range and being operative to detect an initial ion flux comprising a number of ions in the range of 1-100,000 ions.

11. An ion detection system according to claim 1, further comprising a switch designated to toggle between a detection of the first optical signal and the second optical signal.

12. An ion detection system according to claim 11, wherein the photon channeling assembly comprises a single light guide and the separation between the first photon channel and the second photon channel is facilitated by the switch.

13. An ion detection system according to claim 1, wherein the photon channeling assembly comprises a beam splitter configured for splitting the initial flux of photons into the first photon channel and the second photon channel.

14. An ion detection system according to claim 1, wherein the photon channeling assembly comprises a filter for separating the initial flux of photons into the first photon channel and the second photon channel.

15. An ion detection system according to claim 1 being utilized in a mass spectrometer system.

16. A particle detection system for detecting incident particles comprising:
   an optional ion-to-electron converter for converting incident particles to secondary electrons;
   a scintillator for converting the secondary electrons to an initial flux of photons;
   a photon channeling assembly including a first photon channel and a second photon channel, wherein the photon channeling assembly is configured for separating the initial flux of photons, emitted from the scintillator, into at least a first photon flux channeled into the first photon channel and a second photon flux channeled into the second photon channel; and
   at least one photodetector for detecting at least one of:
      a first optical signal generated at the first photon channel, and
      a second optical signal generated at the second photon channel.

17. A particle detection system detection system according to claim 16, wherein the particle comprises any one of: ions, primary electrons, secondary electrons, tertiary electrons, back scattered electrons, neutrons, molecules, X-rays, gamma-rays, photons and a combination thereof.

18. A photon channeling assembly for separating an initial flux of photons comprising:
   a photon channeling zone wherein the initial photon flux is separated into a first photon flux and a second photon flux;
   a first photon channel for propagation of the first photon flux therethrough and comprising a first light guide having a first longitudinal axis;
   a second photon channel for propagation of the second photon flux therethrough and comprising a second light guide having a second longitudinal axis,
   wherein the first light guide is arranged with respect to the second light guide such that an angle formed between the first and second longitudinal axis is any one of an acute angle, right angle and an obtuse angle; and
   at least one photodetector for detecting at least one of:
      a first optical signal generated at the first photon channel, and
      a second optical signal generated at the second photon channel.

19. A photon channeling assembly according to claim 18 wherein the photon channeling zone comprises any one of:
   a diffusive surface configured for separating the first photon flux from the second photon flux;
   a reflective surface comprising an aperture and configured for separating the first photon flux from the second photon flux;
   a beam splitter configured for separating the first photon flux from the second photon flux; and
   a filter configured for separating the first photon flux from the second photon flux.

20. A method for particle detection of incident particles, comprising:
   optionally converting incident particles to secondary electrons;
   converting the secondary electrons to an initial flux of photons;
   separating the initial flux of photons into at least a first photon flux channeled into a first photon channel and a second photon flux channeled into a second photon channel,
   the first photon channel comprising a first light guide having a first longitudinal axis and the second photon channel comprising a second light guide having a second longitudinal axis,
   wherein the first light guide is arranging with respect to the second light guide such that an angle formed between the first and second longitudinal axis is any one of an acute angle, right angle and an obtuse angle; and
   detecting at least one of:
      a first optical signal generated at the first photon channel, and
      a second optical signal generated at the second photon channel.

21. A method for particle detection of incident particles according to claim 20,
   wherein the separating is performed by at least one of:
      a diffusive surface;
      a reflective surface comprising an aperture;
      a beam splitter; and
      a filter.

* * * * *